(12) United States Patent
Yokouchi et al.

(10) Patent No.: US 9,774,029 B2
(45) Date of Patent: Sep. 26, 2017

(54) ANODE FOR SECONDARY BATTERY, METHOD FOR PRODUCING SAME, AND SECONDARY BATTERY

(71) Applicant: SHOWA DENKO K.K., Minato-ku, Tokyo (JP)

(72) Inventors: Hitoshi Yokouchi, Tokyo (JP); Masahiro Ohmori, Tokyo (JP); Chiaki Sotowa, Tokyo (JP); Masayuki Sanbayashi, Tokyo (JP)

(73) Assignee: SHOWA DENKO K.K., Minato-ku, Tokyo (JP)

( * ) Notice: Subject to any disclaimer, the term of this patent is extended or adjusted under 35 U.S.C. 154(b) by 111 days.

(21) Appl. No.: 14/396,450

(22) PCT Filed: Apr. 22, 2013

(86) PCT No.: PCT/JP2013/061749
§ 371 (c)(1),
(2) Date: Oct. 23, 2014

(87) PCT Pub. No.: WO2013/161749
PCT Pub. Date: Oct. 31, 2013

(65) Prior Publication Data
US 2015/0086850 A1    Mar. 26, 2015

(30) Foreign Application Priority Data

Apr. 27, 2012 (JP) ................. 2012-102723

(51) Int. Cl.
*H01M 4/131* (2010.01)
*H01M 4/48* (2010.01)
(Continued)

(52) U.S. Cl.
CPC ........ *H01M 4/131* (2013.01); *C01G 23/0536* (2013.01); *H01M 4/0416* (2013.01);
(Continued)

(58) Field of Classification Search
None
See application file for complete search history.

(56) References Cited

U.S. PATENT DOCUMENTS

2007/0072080 A1    3/2007  Inagaki et al.
2013/0087203 A1*   4/2013  Tani ............. C07D 213/79
                                                    136/263

FOREIGN PATENT DOCUMENTS

CN       1941459 A    4/2007
CN     101014539 A    8/2007
(Continued)

OTHER PUBLICATIONS

Communication dated Feb. 15, 2016 from the European Patent Office issued in corresponding Application No. 13782356.3.
(Continued)

*Primary Examiner* — Lucas J. O'Donnell
(74) *Attorney, Agent, or Firm* — Sughrue Mion, PLLC

(57) ABSTRACT

In this anode for a secondary battery, method for producing same, and secondary battery, an anode active material is laminated on a surface of a metal foil, the anode active material contains at least titanium dioxide, and the titanium dioxide contains a Brookite crystal phase and contains an amorphous phase in a ratio of 1 vol % to 20 vol %.

15 Claims, 1 Drawing Sheet

(51) Int. Cl.
*C01G 23/053* (2006.01)
*H01M 4/04* (2006.01)
*H01M 4/485* (2010.01)
*H01M 4/62* (2006.01)
*H01M 4/66* (2006.01)
*H01M 4/02* (2006.01)

(52) U.S. Cl.
CPC ......... *H01M 4/0471* (2013.01); *H01M 4/483* (2013.01); *H01M 4/485* (2013.01); *C01P 2004/82* (2013.01); *C01P 2006/80* (2013.01); *H01M 4/625* (2013.01); *H01M 4/661* (2013.01); *H01M 2004/027* (2013.01)

(56) References Cited

FOREIGN PATENT DOCUMENTS

| | | |
|---|---|---|
| EP | 1757365 A1 | 2/2007 |
| EP | 2 284 235 A1 | 2/2011 |
| EP | 2 471 869 A1 | 7/2012 |
| EP | 2 472 527 A1 | 7/2012 |
| EP | 2 472 646 A1 | 7/2012 |
| JP | 9-204937 A | 8/1997 |
| JP | 3256801 B2 | 2/2002 |
| JP | 2002-134103 A | 5/2002 |
| JP | 2006-093037 A | 4/2006 |
| JP | 2006-335619 A | 12/2006 |
| JP | 2007-226969 A | 9/2007 |
| JP | 2008-60060 A | 3/2008 |
| JP | 2008-117625 A | 5/2008 |
| JP | 2009-170132 A | 7/2009 |
| JP | 2009-176540 A | 8/2009 |
| JP | 2009-277660 A | 11/2009 |
| JP | 4393610 B2 | 1/2010 |
| JP | 2010-034412 A | 2/2010 |
| JP | 2010-212167 A | 9/2010 |
| JP | 2011-14368 A | 1/2011 |
| JP | 2013-33685 A | 2/2013 |
| KR | 10-2007-0036707 A | 4/2007 |
| WO | 2008/114667 A1 | 9/2008 |
| WO | 2009/147989 A | 12/2009 |
| WO | WO 2010050575 A1 * | 5/2010 ......... C09B 23/0091 |
| WO | 2011/024797 A1 | 3/2011 |
| WO | 2011/024798 A1 | 3/2011 |
| WO | 2011/024799 A1 | 3/2011 |
| WO | 2012/017752 A1 | 2/2012 |
| WO | 2012/029328 A2 | 3/2012 |

OTHER PUBLICATIONS

M. Anji Reddy, et al., "Lithium Intercalation into Nanocrystalline Brookite $TiO_2$", Electrochemical and Solid-State Lettters, 2007, pp. A29-A31, vol. 10, No. 2.

Du-Hee Lee, et al., "Preparation of Brookite-Type $TiO_2$/Carbon Nanocomposite Electrodes for Application to Li Ion Batteries", European Journal of Inorganic Chemistry, Feb. 2008, pp. 878-882, vol. 2008, Issue 6.

M. Anji Reddy, et al., "Crystallite Size Constraints on Lithium Insertion into Brookite $TiO2$", Electrochemical and Solid-State Letters, May 28, 2008, pp. A132-A134, vol. 11, No. 8.

International Search Report for PCT/JP2013/061749 dated Jul. 23, 2013 [PCT/ISA/210].

Communication dated Dec. 23, 2015, issued by the State Intellectual Property Office of the P.R.C. in corresponding Chinese Application No. 201380021276.1.

Zhenguo Yang et al., "Nanostructures and lithium electrochemical reactivity of lithium titanites and titanium oxides: A review", Journal of Power Sources, Dec. 31, 2009, vol. 192, pp. 588-598.

Communication dated Aug. 30, 2016 from the Korean Intellectual Property Office in counterpart Korean Application No. 10-2014-7029140.

Communication dated Oct. 18, 2016 from the Japanese Patent Office in counterpart Japanese application No. 2014-512549.

* cited by examiner

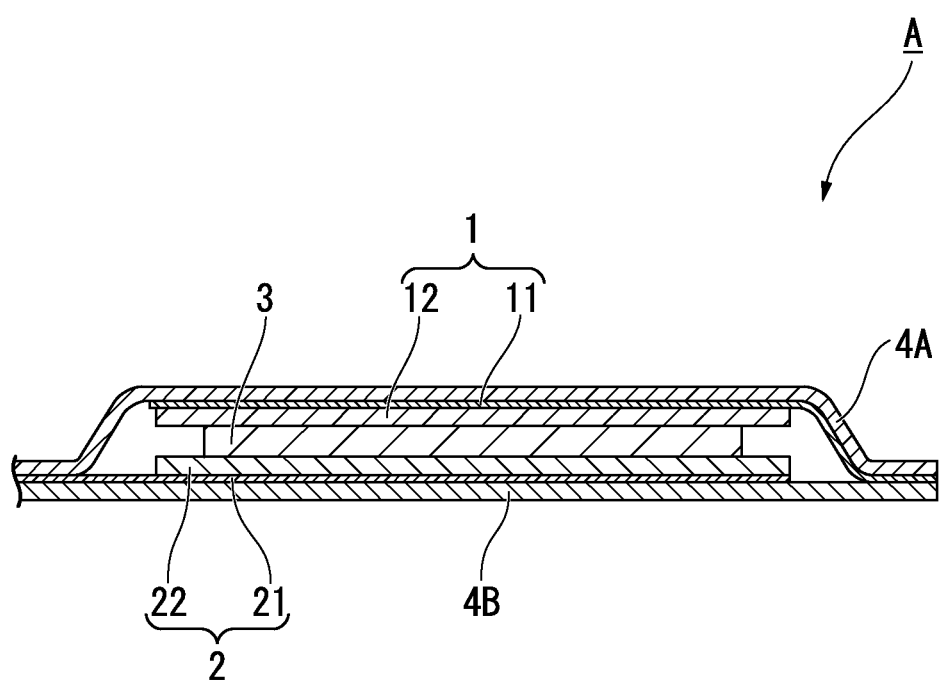

ANODE FOR SECONDARY BATTERY, METHOD FOR PRODUCING SAME, AND SECONDARY BATTERY

TECHNICAL FIELD

The present invention relates to an anode for a secondary battery, a method for producing same, and a secondary battery.

Priority is claimed on Japanese Patent Application No. 2012-102723, filed Apr. 27, 2012, the content of which is incorporated herein by reference.

BACKGROUND ART

In recent years, there has been a demand for the reduction of carbon dioxide generated in various fields to reduce global warming. For example, in the automobile field, an increasing number of gasoline vehicles of the related art are being shifted to electric vehicles or hybrid vehicles equipped with a secondary battery exhausting a small amount of carbon dioxide, and particularly, the development of a lithium ion secondary battery having an influence on travel distance, safety, and reliability has been attracting attention. The above-described lithium ion secondary battery is, generally, made up of a non-aqueous electrolytic solution, a separator, an external packaging material, and the like in addition to a cathode including a cathode active material layer formed on a cathode current collector and an anode including an anode active material layer formed on an anode current collector.

In the past, an oxide of a transition metal including lithium was used as a cathode active material for the ordinarily-distributed lithium ion secondary battery, and the cathode active material was formed on an aluminum foil that served as a cathode current collector. In addition, a carbon material such as graphite was used as an anode active material, and the anode active material was formed on a copper foil that served as an anode current collector. In addition, the cathode and the anode were disposed through a separator in an electrolytic solution containing a non-aqueous organic solvent in which a lithium salt electrolyte was dissolved.

The lithium ion secondary battery is charged and discharged as described below. During the charge, lithium ions held in the cathode active material are de-intercalated and thus discharged into the electrolytic solution, and in the anode active material, the lithium ions from the electrolytic solution are absorbed between the crystal layers of the carbon material, thereby developing a reaction. In addition, during the discharge, a reverse reaction of the reaction during the charge progresses, the lithium ions are released from the anode active material, and are occluded in the cathode active material, thereby developing a reaction.

However, in a system in which a carbon material such as graphite is used for the anode, when the system is almost fully discharged, the anode potential reaches near 0 V, and therefore dendrite is precipitated. As a result, lithium ions that were originally intended to be used for electron transportation are consumed, and furthermore, the anode current collector is corroded and deteriorated. When the above-described corrosion and deterioration proceeds, there is a possibility of the characteristic deterioration or malfunction of the lithium ion secondary battery. Therefore, in the system in which a carbon material such as graphite is used for the anode, the precise control of the charge and discharge voltage is required. In the above-described system, while the potential difference between the cathode active material and the anode active material is, theoretically, high, only a part of lithium ions can be used, and there is a problem with the charge and discharge efficiency.

As a result, in recent years, research and development of an anode active material capable of obtaining a particularly high potential have been actively conducted. For example, since titanium dioxide has a potential of approximately 1.5 V, which is higher than the potential of a carbon material of the related art, titanium dioxide has attracted attention as a material that does not precipitate dendrite, is extremely safe, and is capable of obtaining favorable characteristics.

For example, PTL 1 describes anatase-type titanium dioxide and rutile-type titanium dioxide as examples regarding a secondary battery in which a titanium oxide that is obtained by spraying and drying a slurry containing a water-containing titanium oxide, and heating and removing an organic binder, and has a pore amount of secondary particles in a range of 0.005 $cm^3/g$ to 1.0 $cm^3/g$ is used as an electrode active material.

In addition, recently, there has been a report saying that titanium dioxide having a bronze-type crystal structure is also a promising anode active material. For example, PTL 2 describes a secondary battery in which bronze-type titanium dioxide having a micron-size isotropic shape is used as an electrode active material.

Additionally, NPL 1 describes battery characteristics in a case in which brookite-type titanium dioxide is used as an anode active material.

Here, as crystalline titanium dioxide, for example, an anatase-type crystal phase, a rutile-type crystal phase, a brookite-type crystal phase, a bronze-type crystal phase, a hollandite-type crystal phase, a ramsdellite-type crystal phase, and the like are known. However, a number of studies have been thus far conducted regarding sole crystal phases, but there have been few studies regarding the battery characteristics in a system containing a mixed crystal phase or an amorphous phase. Particularly, thus far, there have been no actual reports regarding titanium dioxide satisfying electric capacitance, cycle characteristics, and high-rate charge and discharge characteristics.

For example, a secondary battery in which the anatase-type or rutile-type titanium oxide described in PTL 1 is used as an anode active material has favorable cycle characteristics, but has a small electric capacitance of 160 mAh/g. Based on the above-described fact, to obtain a predetermined battery capacitance, it is necessary to use a large amount of the anode active material. Therefore, in the secondary battery described in PTL 1, there is a problem in that the weight or volume of the entire battery increases.

In addition, the secondary battery in which the bronze-type titanium dioxide as described in PTL 2 is used as an electrode active material has a small electric capacitance of 170 mAh/g, and furthermore, the process therefor is complicated and requires a long period of time, and therefore there are a number of problems in putting the secondary battery into practical use. In addition, PTL 2 describes nothing about the cycle characteristics or the high-rate charge and discharge characteristics.

Meanwhile, NPL 1 describes the battery characteristics in a case in which brookite-type titanium dioxide is used as an anode active material. However, in the technique described in NPL 1, the initial electric capacitance is high, but the electric capacitance decreases to 170 mAh/g after 40 cycles, and therefore there is a problem in that the cycle characteristics are poor. In addition, in NPL 1, since the charge and discharge rate is as low as C/10 (0.1 C), it is evident that, in a case in which high-rate charge and discharge is carried out, the cycle characteristics further deteriorate.

CITATION LIST

Patent Literature

[PTL 1] PCT International Publication No. WO2008/114667
[PTL 2] Japanese Unexamined Patent Application, First Publication No. 2008-117625

Non-Patent Literature

[NPL 1] ANJI REDDY M., VARADARAJU U. V., (Indian Inst. of Technol. Madras, Chemai, IND), SATYA KISHORE M., PRALONG V., RAVEAU B. (ENSICAEN, Caen, FRA), Electrochem Solid-State Lett, 10-2, A29-A31 (2007)

SUMMARY OF INVENTION

Technical Problem

The present invention has been made in consideration of the above-described problems, and an object of the present invention is to provide an anode for a secondary battery for which an anode active material containing titanium dioxide is used and which has a high electric capacitance and is excellent in terms of cycle characteristics and high-rate charge and discharge characteristics, and a method for producing the same. In addition, another object of the present invention is to provide a secondary battery for which the above-described anode for a secondary battery is used, and which is excellent in terms of cycle characteristics of charge and discharge, and the like.

Solution to Problem

As a result of repeated intensive studies, the present inventors found that, first, when titanium dioxide containing at least a brookite-type crystal phase and further containing an amorphous phase is employed as an anode active material, high electric capacitance, favorable cycle characteristics, and high-rate charge and discharge characteristics can be produced. In addition, the inventors further found that, when the ratio of the amorphous phase is determined within an appropriate range, the above-described effect can be more significantly obtained, and completed the present invention.

That is, the present invention has configurations described below.

[1] An anode for a secondary battery obtained by laminating a layer containing at least an anode active material on a metal foil, in which the anode active material contains at least titanium dioxide, and the titanium dioxide includes a brookite-type crystal phase, and includes an amorphous phase in a ratio of 1 vol % to 20 vol % with respect to all crystal phases.

[2] The anode for a secondary battery according to the above-described [1], in which the titanium dioxide includes the brookite-type crystal phase in a ratio of 1 vol % to 80 vol % with respect to all crystal phases of the titanium dioxide.

[3] The anode for a secondary battery according to the above-described [1] or [2], in which the titanium dioxide further includes one or more crystal layers selected from the group consisting of anatase-type titanium dioxide, rutile-type titanium dioxide, and bronze-type titanium dioxide.

[4] The anode for a secondary battery according to any one of the above-described [1] to [3], in which an average particle diameter of primary particles of the titanium dioxide is in a range of 0.001 μm to 0.1 μm.

[5] The anode for a secondary battery according to any one of the above-described [1] to [4], further including a carbonaceous material.

[6] The anode for a secondary battery according to the above-described [5], in which the carbonaceous material is one or more selected from the group consisting of acetylene black, ketjen black, furnace black, channel black, natural graphite, artificial graphite, carbon nanotubes, carbon nanofibers and carbon fibers.

[7] The anode for a secondary battery according to any one of the above-described [1] to [6], in which the metal foil is made of an aluminum foil.

[8] A method for producing an anode for a secondary battery including in the following order: a step of synthesizing powder containing at least the titanium dioxide by hydrolyzing a titanium-containing compound in an acidic aqueous solution so as to generate titanium dioxide, and then drying the titanium dioxide, a step of annealing the powder so as to control the titanium dioxide contained in the powder to have a structure including at least a brookite-type crystal phase and further including an amorphous phase in a range of 1 vol % to 20 vol %, thereby generating a powder-form anode active material, and a step of dispersing the powder-form anode active material in a dispersion solution so as to adjust a coating fluid, applying and drying the coating fluid on one surface or both surfaces of a metal foil.

[9] The method for producing an anode for a secondary battery according to the above-described [8], in which, in the step of synthesizing the powder, a chloride is used as the titanium-containing compound.

[10] The method for producing an anode for a secondary battery according to the above-described [8] or [9], in which, when the powder is annealed, a temperature is set in a range of 300° C. to 800° C., and a time is set in a range of 10 minutes to 300 minutes.

[11] The method for producing an anode for a secondary battery according to any one of the above-described [8] to [10], in which, when the powder is annealed, an atmosphere is set to include water vapor in a mass ratio of 0.01 to 1.0 with respect to the powder.

[12] A secondary battery including the anode for a secondary battery according to any one of the above-described [1] to [7].

[13] The secondary battery according to the above-described [12], formed by enclosing the anode for a secondary battery in an external packaging material together with a cathode, a separator, and a non-aqueous electrolytic solution.

[14] The secondary battery according to the above-described [13], in which the external packaging material is obtained by laminating a resin on both surfaces of an aluminum foil.

Advantageous Effects of Invention

According to the anode for a secondary battery of the present invention, a high electric capacitance, excellent cycle characteristics, and high-rate charge and discharge characteristics can be obtained by using titanium dioxide including at least a brookite-type crystal phase and an amorphous phase as an anode active material, and furthermore, setting the ratio of the amorphous phase in an appropriate range.

In addition, according to the method for producing an anode for a secondary battery of the present invention, the method is employed including in the following order a step of synthesizing powder containing at least titanium dioxide, a step of annealing the powder so as to control the titanium dioxide contained in the powder to have a structure including at least a brookite-type crystal phase and further including an amorphous phase in a range of 1 vol % to 20 vol %, thereby generating a powder-form anode active material, and a step of adjusting a coating fluid in which an anode active material is dispersed, applying and drying the coating fluid on one surface or both surfaces of the metal foil. Therefore, it becomes possible to manufacture an anode for a secondary battery having a high electric capacitance, excellent cycle characteristics and high-rate charge and discharge characteristics.

In addition, according to the secondary battery of the present invention, since the above-described anode for a secondary battery is used, the electric capacitance increases, and the cycle characteristics and the high-rate charge and discharge characteristics become favorable.

BRIEF DESCRIPTION OF DRAWING

FIG. 1 is a cross-sectional view schematically illustrating an anode for a secondary battery as an embodiment of the present invention.

DESCRIPTION OF EMBODIMENTS

Hereinafter, embodiments of the anode for a secondary battery, the method for producing the same, and the secondary battery of the present invention will be described with appropriate reference to the accompanying drawings.

[The Anode for a Secondary Battery]

An anode for a secondary battery 1 described in the present embodiment is obtained by laminating a layer containing at least an anode active material 12 on a surface of a metal foil 11 as exemplified in FIG. 1, the anode active material 12 contains at least titanium dioxide, the titanium dioxide includes a brookite-type crystal phase and includes an amorphous phase in a ratio of 1 vol % to 20 vol % with respect to all crystal phases. In addition, the anode for a secondary battery 1 of the present embodiment is capable of configuring a secondary battery A formed by interposing a separator 3 between the anode for a secondary battery and a cathode 2 formed by laminating a current collector 21 and a cathode active material 22, and enclosing the components using external packaging materials 4A and 4B as illustrated in an example of FIG. 1. Furthermore, in the secondary battery A, an electrolyte made of a non-aqueous electrolytic solution or the like, which is not illustrated in the drawing, is enclosed in a space ensured by the external packaging materials 4A and 4B.

(The Metal Foil)

There is no particular limitation regarding the material of the metal foil 21 used for the anode for a secondary battery 1 according to the present invention, and generally, a material used for a current collector in a lithium ion secondary battery can be employed. Examples thereof include foils made of aluminum, nickel, titanium, or an alloy thereof. In addition, as the metal foil 21, it is preferable to use a foil made of aluminum or an alloy thereof since there is a requirement that the material be inexpensive or an oxide film on the surface be stable so that the qualities do not easily vary (in the following description, in some cases, foils made of aluminum or an alloy thereof will be collectively called aluminum foils).

There is no particular limitation regarding the material of the aluminum foil (metal foil 21), and a well-known material as the current collector for a secondary battery can be used. It is more preferable to use a pure aluminum foil or an aluminum alloy foil containing 95 mass % or more of aluminum. Here, examples of the pure aluminum foil include an A1085 material, and examples of the aluminum alloy foil include a (Mn-added) A3003 material.

The thickness of the aluminum foil is not particularly limited, but is, generally, preferably in a range of 5 μm to 200 μm from the viewpoint of miniaturization of the secondary battery, the handling properties of the aluminum foil, a current collector, an electrode, and the like obtained using the aluminum foil, and the like. In addition, in a case in which a roll-to-roll producing method is carried out, it is preferable to use an aluminum foil having a thickness in a range of 5 μm to 100 μm.

In addition, regarding the shape of the aluminum foil, the foil may not include holes, or may include holes like a two-dimensional mesh foil, a three-dimensional net-shaped foil, a punching metal foil, and the like.

The surface of the metal foil 21 may be provided with a coated film containing a conductive material to improve the rate characteristics of the secondary battery. Examples of the coated film used herein include coated films described in Japanese Unexamined Patent Application, First Publication No. 9-204937, Japanese Unexamined Patent Application, First Publication No. 2002-134103, Japanese Unexamined Patent Application, First Publication No. 2007-226969, Japanese Unexamined Patent Application, First Publication No. 2008-060060, Japanese Unexamined Patent Application, First Publication No. 2009-170132, Japanese Unexamined Patent Application, First Publication No. 2009-176540, Japanese Unexamined Patent Application, First Publication No. 2009-277660, Japanese Unexamined Patent Application, First Publication No. 2010-212167, the pamphlet of PCT International Publication No. WO2009/147989, the pamphlet of PCT International Publication No. WO2011/024797, the pamphlet of PCT International Publication No. WO2011/024798, the pamphlet of PCT International Publication No. WO2011/024799, and the pamphlet of PCT International Publication No. WO2012/029328.

(Anode Active Material)

The anode active material in the present invention contains titanium dioxide including at least a brookite-type crystal phase and further including an amorphous phase. The content of the titanium dioxide in the anode active material is preferably in a range of 50 mass % to 100 mass %, and more preferably in a range of 70 mass % to 100 mass %.

The shape of the primary particle of titanium dioxide may be a spherical shape, a plate shape, a polyhedral shape, a needle shape, a rod shape, a ring shape, an indefinite shape, or the like, and is not particularly limited. In addition, the average particle diameter of the primary particles is preferably in a range of 0.001 μm to 0.1 μm, and more preferably in a range of 0.005 μM to 0.05 μm. When the average particle diameter of the primary particles is within the above-described range, the particle surfaces are highly active, and lithium ions are smoothly occluded and released, which is preferable. In addition, when the average particle diameter of the primary particles is set in the above-described range, the dispersibility is increased, and the productivity also becomes favorable.

Meanwhile, the average particle diameter of the primary particles described in the present invention refers to the number-average particle diameter, and can be obtained by measuring 100 to 1000 primary particles of titanium dioxide particles using an electron microscope, and arithmetically averaging the measured values. At this time, in a case in which the primary particles have a spherical shape, the sphere equivalent diameter is considered as the particle diameter, and in a case in which the primary particles have a plate shape, a polyhedral shape, a needle shape, a rod shape, a ring shape, an indefinite shape, or the like, the longest diameter is considered as the particle diameter.

In addition, although a crystal phase of titanium dioxide, an anatase-type crystal phase, a rutile-type crystal phase, a brookite-type crystal phase, a bronze-type crystal phase, a hollandite-type crystal phase, a ramsdellite-type crystal phase, and the like are known, titanium dioxide including at least a brookite-type crystal phase and including an amorphous phase is selected. The reasons for the above are explained below. Since the brookite-type crystal phase has a relatively smaller crystal density than the anatase-type crystal phase or the rutile-type crystal phase, and is capable of easily absorbing lithium ions between crystal lattices, the electric capacitance increases. Furthermore, when titanium dioxide includes an amorphous phase, a capability that absorbs lithium ions improves in the same manner as described above, and furthermore, during high-rate charge and discharge, sites in which lithium ions are occluded are not specifically but randomly generated, and therefore a reaction develops more smoothly, and the high-rate charge and discharge characteristics improve.

The ratio of the brookite-type crystal phase is preferably in a range of 1 vol % to 80 vol %, more preferably in a range of 10 vol % to 70 vol %, and still more preferably in a range of 15 vol % to 65 vol % with respect to all crystal phases in titanium dioxide. When the ratio of the brookite-type crystal phase in titanium dioxide is 1 vol % or more, an effect of occluding and releasing lithium ions is obtained. In addition, when the ratio is 80% vol or less, it becomes possible to maintain the cycle characteristics.

Furthermore, the ratio of the amorphous phase is preferably in a range of 1 vol % to 20 vol %, more preferably in a range of 3 vol % to 20 vol %, and still more preferably in a range of 10 vol % to 20 vol % with respect to all crystal phases in titanium dioxide. When the ratio of the amorphous phase in the crystal phase of titanium dioxide is 1 vol % or more, similar to the brookite-type crystal phase, an effect of occluding and releasing lithium ions is obtained. In addition, when the ratio of the amorphous phase in titanium dioxide is 20 vol % or less, the ratio of the crystalline phase in all crystal phases in titanium dioxide is maintained within a predetermined range, and the cycle characteristics become favorable. This is considered to be because, when the ratio of the crystalline phase in titanium dioxide is maintained in a predetermined range, during the repetition of the charge and discharge cycle, expansion and shrinkage accompanied by the occlusion and release of lithium ions is suppressed, and the cycle characteristics become favorable.

For the above-described reasons, it is evident that the brookite-type crystal phase and the amorphous phase are effective when the ratio thereof in titanium dioxide is within a specific range. Furthermore, in addition to the above-described crystal phase, examples of a crystal phase having a high crystal density and a dense crystal lattice include the anatase-type crystal phase, the rutile-type crystal phase, and the bronze-type crystal phase, and it is assumed that it is more effective to include the above-described crystal phases.

Meanwhile, in the present invention, there is no particular limitation regarding the kinds and ratios of the crystal phases other than the brookite-type crystal phase and the amorphous phase in titanium dioxide; however, generally, titanium dioxide includes 10 vol % to 70 vol % of an anatase-type crystal layer, and furthermore, depending on cases, includes a rutile-type or bronze-type crystal layer.

The analysis of the ratios of the above-described crystal phases can be carried out using an X-ray diffraction apparatus. At this time, first, titanium dioxide powder is sufficiently crushed using an agate mortar so as to remove all compact clusters. Next, to identify the amorphous phase, as an internal standard, nickel (II) oxide powder (99.9% reagent) is sufficiently mixed with the obtained titanium dioxide powder using the agate mortar so that the content of the nickel oxide reaches 10 mass %. In addition, the powder mixture is measured using the X-ray diffraction apparatus (for example, PANalytical X 'Pert MRD apparatus (registered trademark) manufactured by Spectris Co., Ltd.). At this time, the measurement conditions are, for example, a tube voltage of 40 kV, a tube current of 20 mA, and a scanning range 2θ of 10 degrees to 80 degrees. In addition, the Rietveld analysis of the obtained data is carried out, and the crystal phases are identified. The Rietveld analysis can be carried out using commercially available software (for example, PANalytical X 'Pert High Score Plus (registered trademark) manufactured by Spectris Co., Ltd.).

Meanwhile, in the present invention, in a producing method described below, it is possible to coat the surface of titanium dioxide with condensed phosphate containing an alkali earth metal by employing a method in which at least any one of phosphoric acid ($H_3PO_4$) and sulfuric acid ($H_2SO_4$) are added to an acidic aqueous solution in advance, a titanium-containing compound is hydrolyzed so as to generate titanium dioxide, and then, furthermore, a compound containing condensed phosphate and the alkali earth metal are added. As described above, in a case in which a configuration in which the surface of titanium dioxide is coated with condensed phosphate containing an alkali earth metal is employed, the effect that increases the electric capacitance and the effect that improves the cycle characteristics can be more significantly obtained.

In addition, when the concentration of chlorine in titanium dioxide is preferably 1000 ppm or less, and more preferably 800 ppm or less, the occlusion and release of lithium ions is not easily hindered. In addition, the concentration of chlorine is preferably 100 ppm or more from the viewpoint of the easy production of titanium dioxide.

(Carbonaceous Material)

The anode active material 12 containing titanium dioxide used in the present invention originally has a low conductivity, and therefore it is more preferable to add a carbonaceous material as a conduction agent. When the carbonaceous material is present at any one or multiple places of the surface of the anode active material, between the anode active materials, and the contact surface between the anode active material and the metal foil, the carbonaceous material plays a role of smoothing the exchanging of electrons, and therefore a carbonaceous material having a high conductivity is preferred. Examples of the carbonaceous material that is preferably used include acetylene black, ketjen black, furnace black, channel black, natural graphite, artificial graphite, carbon nanotubes, carbon nanofibers and carbon fibers. The carbonaceous material can be solely used, or two or more carbonaceous materials can be used in combination.

The carbonaceous material may be made up of particles having a spherical shape, an indefinite shape, or the like, or may be made up of particles having an anisotropic shape such as a needle shape or a rod shape.

Regarding carbonaceous material particles, the particle size is not particularly limited, but the number-average primary particle diameter is preferably in a range of 10 nm to 5 μm, and more preferably in a range of 10 nm to 1 μm. The above-described number-average primary particle diameter can be obtained by measuring 100 to 1000 primary particles of carbonaceous material particles using an electron microscope, and arithmetically averaging the measured values. At this time, in a case in which the primary particles have a spherical shape, the sphere equivalent diameter is considered as the particle diameter, and in a case in which the primary particles have an indefinite shape, the longest diameter is considered as the particle diameter.

Regarding the above-described carbon nanotube or carbon nanofiber, for example, the average fiber diameter is generally in a range of 0.001 μm to 0.5 μm, and preferably in a range of 0.003 μm to 0.2 μm, and the average fiber length is generally in a range of 1 μm to 100 μm, and preferably in a range of 1 μm to 30 μm in terms of the improvement of the conductivity. The average fiber diameter and average fiber length of the above-described carbonaceous material can be obtained by observing the fiber diameters and fiber lengths of 100 to 1000 conductive fibers using an electron microscope, and obtaining the number-based average values.

There is no particular limitation regarding the method for selectively placing the carbonaceous material on the surface of the anode active material. Examples thereof include methods in which the carbonaceous material is treated in a gaseous phase such as the gas-phase coating method described in Japanese Unexamined Patent Application, First Publication No. 2011-14368 in which hydrocarbon-based gas is used as the source of the carbonaceous material, and the chemical vapor deposition method described in Japanese Patent No. 4393610. In addition, it is possible to select a solid-phase method, for example, a method in which the anode active material, a binding material, and the carbonaceous material are dispersed in an appropriate solvent in advance, are mixed using, for example, a ball mill, and are dried, thereby attaching the carbonaceous material to the surface of the anode active material, or a method in which the anode active material and the carbonaceous material are mixed in a powder state without using a binding material, and a dry mechano-chemical milling treatment is carried out using a planetary ball mill, thereby directly coating the surface of the anode active material. In this case, when the entire surface of the anode active material is coated, the occlusion and release of lithium ions is influenced, and therefore it is preferable not to fully coat the surface of the anode active material.

The mass of the carbonaceous material with respect of the anode active material 12 is preferably in a range of 1 mass % to 15 mass %, and more preferably in a range of 5 mass % to 10 mass %. When the mass of the carbonaceous material is within the above-described range, the carbonaceous material is sufficiently dispersed, and the surface of the anode active material can be coated with no eccentric presence of the carbonaceous material. That is, when the mass of the carbonaceous material with respect to the entire anode active material 12 is 1 mass % or more, the conductivity improves, and, when the mass of the carbonaceous material with respect to the entire anode active material is set to 15 mass % or less, it is possible to prevent the surface of the anode active material from being excessively coated with the carbonaceous material.

In addition, there is no particular limitation regarding the method for placing the carbonaceous material between the anode active materials, and it is possible to employ a method that has been ordinarily carried out thus far in which the carbonaceous material is added to an active material layer in a lithium ion secondary battery. For example, it is possible to select a method in which the anode active material, a binding material, and the carbonaceous material are dispersed in an appropriate solvent, the mixture is applied to the surface of a current collector represented by a metal foil, and is dried. In this case, the amount of the carbonaceous material in the entire anode for a secondary battery 1 excluding the metal foil is preferably in a range of 1 mass % to 15 mass %, and more preferably in a range of 5 mass % to 10 mass %. That is, when the amount of the carbonaceous material is set to 1 mass % or more, the conductivity improves, and, when the amount of the carbonaceous material is set to 15 mass % or less, the mass proportion of the anode active material can be sufficiently ensured, and therefore the electric capacitance per unit mass also can be sufficiently obtained.

In addition, there is no particular limitation regarding the method for placing the carbonaceous material on the contact surface between the anode active material and the metal foil. For example, it is possible to select a method in which the carbonaceous material and a binding material are dispersed in an appropriate solvent in advance, the mixture is applied onto the metal foil, and then is dried, or a gas-phase method such as a sputtering method, a deposition method, or a chemical vapor deposition method. In this case, an increase in the number of the contact points between the anode active material and the carbonaceous material improves the conductivity, and therefore the coverage of the carbonaceous material to the metal foil is preferably in a range of 50% to 100%, and the thickness of the carbonaceous material is preferably in a range of 0.1 μm to 5 μm. When the thickness of the carbonaceous material on the metal foil is set to 0.1 μm or more, it is possible to apply the carbonaceous material to be evenly thin, and when the thickness is set to 5 μm or less, it becomes possible to suppress the resistance value that is dependent on the film thickness. That is, when the metal foil is coated with the carbonaceous material in a film thickness within the above-described range, the adhesiveness to the anode active material improves, thus, the contact resistance can be reduced, and consequently, it becomes possible to decrease the internal resistance or impedance of the secondary battery for which the anode for a secondary battery is used.

Meanwhile, in a case in which the carbonaceous material and/or the binding material described below are placed in the anode active material 12 as described above, when a large amount of the carbonaceous material or the binding material that does not absorb lithium is added, the electric capacitance decreases, and therefore the total amount of the carbonaceous material and the binding material is preferably 30 mass % or less with respect to the total mass of the anode for a secondary battery 1 excluding the metal foil 11.

(Binding Material)

In a case in which the above-described carbonaceous material is added to the anode active material 12, or a case in which the anode for a secondary battery 1 is formed by attaching the anode active materials 12 to each other or attaching the anode active material 12 to the metal foil 11, a configuration including a binding material may be employed. In this case, the binding material is not particularly limited, and it is possible to use a well-known binding material that is used for an electrode of a lithium ion secondary battery. In addition, as the binding material, generally, a polymer is used, and examples of the polymer include acryl-based polymers, vinyl-based polymers, fluorine-based polymers, polysaccharides, styrene butadiene rubber, and the like.

Examples of the acryl-based polymer include polymers obtained by polymerizing an acryl-based monomer such as acrylic acid, methacrylic acid, itaconic acid, (meth)acryloyl morpholine, N,N-dimethyl (meth)acrylamide, N,N-dimethylaminoethyl (meth)acrylate, or glycerin (meth)acrylate.

Examples of the vinyl-based polymer include polymers obtained by polymerizing a vinyl-based monomer such as polyvinyl acetal, an ethylene-vinyl alcohol copolymer, polyvinyl alcohol, poly(N-vinylformamide), poly(N-vinyl-2-pyrrolidone), or poly(N-vinylacetoamide).

Examples of the fluorine-based polymer include polytetrafluoride ethylene (PTFE), polyvinylidene difluoride (PVdF), and the like.

Examples of the polysaccharide include polysaccharides obtained by polycondensing a monosaccharide such as chitin, chitosan, cellulose, starch, a derivative thereof, or the like. In a case in which the polysaccharide is used, to improve the dispersibility of the polysaccharide, an organic acid may be added, and particularly, a divalent or more organic acid is preferably added since the crosslinking property improves, and the adhesiveness or the solvent resistance becomes favorable.

In addition, the above-described binding material may be solely used, or a mixture of two or more binding materials may be used.

In a case in which the above-described binding material is used, when the anode active material 12 is set to include the binding material preferably in a range of 1 mass % to 15 mass %, and more preferably in a range of 5 mass % to 10 mass %, it is possible to obtain the anode for a secondary battery 1 in which peeling or cracking does not occur, and the conductivity is ensured.

(Additives)

The anode active material 12 may contain well-known additives used for an anode active material layer in a lithium ion secondary battery such as a thickener in addition to the anode active material, the carbonaceous material, and the binding material described above, and examples thereof include carboxymethyl cellulose and the like.

[The Method for Producing the Anode for a Secondary Battery]

Next, the method for producing the anode for a secondary battery 1 according to the present invention will be described.

The method for producing the anode for a secondary battery 1 that is a preferred aspect of the embodiment is a method including in the following order a step of synthesizing powder (anode active material) containing at least the titanium dioxide by hydrolyzing a titanium-containing compound in an acidic aqueous solution so as to generate titanium dioxide, and then drying the titanium dioxide, a step of annealing the powder so as to control the titanium dioxide contained in the powder to have a structure including at least a brookite-type crystal phase and further including an amorphous phase in a range of 1 vol % to 20 vol %, thereby generating a powder-form anode active material 12, and a step of dispersing the powder-form anode active material 12 in a dispersion solution so as to adjust a coating fluid, applying and drying the coating fluid on one surface or both surfaces of the metal foil 11.

(The Step of Synthesizing the Powder)

First, in the present embodiment, a titanium-containing compound is hydrolyzed in an acidic aqueous solution so as to generate titanium dioxide, and then powder (anode active material) containing the titanium dioxide is synthesized.

The method for generating titanium dioxide is not particularly limited, and it is possible to select any one from producing methods in which a different starting material is used such as a chlorine method in which titanium chloride is used as the titanium-containing compound, and titanium dioxide is purified from the chloride or a sulfuric acid method in which titanium dioxide is purified from titanium sulfate, and producing methods in which the reaction conditions are different such as a gas phase method, a liquid phase method, or a solid phase method. Among the above-described methods, a method in which a titanium-containing compound is hydrolyzed in an acidic liquid, thereby obtaining titanium dioxide is preferable since it is easy to control the ratio or primary particle diameter of the brookite-type crystal phase in a wide range. In addition, it is preferable to generate titanium dioxide in an acidic liquid since particles having extremely small primary particles and a large specific surface area are obtained, and the activity of the particle surfaces is high, and therefore, in a case in which titanium dioxide is used as the anode active material, lithium ions are smoothly occluded and released.

The pH of the acidic aqueous solution used for the generation of titanium dioxide is preferably in a range of 0.1 to 4, and more preferably in a range of 0.5 to 3. When the pH of the acidic aqueous solution is 0.1 or more, the hydrolysis reaction rate also increases, the primary particles of titanium dioxide do not become too large, and therefore the activity of the particle surfaces does not decrease, and furthermore, the productivity also becomes favorable. In addition, when the pH of the acidic aqueous solution is 4 or less, it is possible to suppress the agglomeration of the primary particles of titanium dioxide being generated, and therefore it is not necessary to provide a crushing step or the like, and it becomes possible to suppress the producing costs while ensuring a high productivity.

The liquid temperature during the hydrolysis is preferably in a range of 75° C. to the boiling point of the acidic aqueous solution, and more preferably in a range of 85° C. to the boiling point of the acidic aqueous solution. When the liquid temperature during the hydrolysis is 75° C. or higher, there is no case in which the hydrolysis rate becomes significantly slow, and it is possible to maintain a high productivity. In addition, when the liquid temperature of the acidic aqueous solution is equal to or lower than the boiling point of the solution, a large-scale facility such as a pressurized vessel is not required, and the temperature is suitable for practical use from the viewpoint of the producing costs.

The method for adjusting the pH or liquid temperature of the acidic aqueous solution is not particularly limited. Examples thereof include a method in which an aqueous solution obtained by dissolving water and an acidic titanium-containing compound is mixed at room temperature in advance, at this time, the pH is adjusted using the concentration of the acidic titanium-containing compound, then, the liquid temperature is gradually increased, and a hydrolysis reaction is caused in the above-described temperature range. In addition, the examples also include a method in which an aqueous solution of an acidic titanium-containing compound is added dropwise to previously-prepared water that has been heated to the above-described temperature range in the above-described temperature range, thereby causing a hydrolysis reaction. In this case, the time required for the dropwise addition of the aqueous solution can be appropriately determined depending on the volume of a reaction layer.

The time during which the hydrolysis reaction is caused is preferably in a range of 10 minutes to 10 hours, and more preferably in a range of 30 minutes to 5 hours. When the hydrolysis reaction time is set to 10 minutes or longer, it is possible to let the hydrolysis reaction sufficiently proceed. In addition, when the reaction time is set to 10 hours or shorter, it is possible to improve the productivity of an electrode active material. Meanwhile, in a case in which the hydrolysis reaction is caused using the above-described method in which an aqueous solution obtained by dissolving water and an acidic titanium-containing compound is mixed at room temperature, and then the temperature is increased, the starting point of the reaction time is set to a point in time when the increase in the liquid temperature is completed. In addition, in a case in which the hydrolysis reaction is caused using the method in which an aqueous solution of an acidic titanium-containing compound is added dropwise to water of a predetermined temperature, the starting point of the reaction time is set to a point in time when the dropwise addition starts.

Meanwhile, the hydrolysis reaction in an acidic atmosphere is effective for obtaining the brookite-type crystal phase, and particularly, the brookite-type crystal phase is stably generated in a case in which chlorine is present in the liquid. For the above-described reason, an aqueous solution of titanium tetrachloride is preferred as the titanium-containing compound that is a raw material. The concentration of chlorine in a reaction solution in this case is not particularly limited as long as the pH is within the above-described range; however, as a criterion, the concentration of chlorine is preferably in a range of 100 ppm to 10,000 ppm in terms of the mass. In addition, to set the pH in the above-described range, it is also possible to control hydrogen chloride being generated by heating the reaction solution. For example, when some of the vapor of hydrogen chloride generated from the reaction solution is returned using a reflux condenser, it is possible to prevent a significant decrease of chlorine in the reaction solution. Furthermore, it is also possible to employ a method in which a hydrochloric acid single body is injected into the reaction solution, and in this case, when the pH is within the above-described range, acids other than hydrochloric acid such as sulfuric acid, acetic acid, and phosphoric acid can also be mixed. In addition, it is also possible to control the crystal phase of titanium dioxide being generated by adding the above-described acids to the reaction solution.

In addition, in the present invention, it is also possible to employ a method in which, before titanium dioxide is generated in the above-described order, at least any one of phosphoric acid ($H_3PO_4$) and sulfuric acid ($H_2SO_4$) are added to the acidic aqueous solution in advance. When $H_3PO_4$ or $H_2SO_4$ is added to the acidic aqueous solution as described above, the dispersibility of titanium dioxide being generated improves. Therefore, not only is the generation of coarse particles through the agglomeration of the primary particles suppressed, the above-described hydrolysis reaction is also accelerated, and it becomes possible to efficiently generate titanium dioxide.

Furthermore, in the present invention, it is also possible to coat the surface of titanium dioxide with condensed phosphate containing an alkali earth metal by adding at least one of phosphoric acid ($H_3PO_4$) and sulfuric acid ($H_2SO_4$) to an acidic aqueous solution in advance, hydrolyzing a titanium-containing compound in the acidic aqueous solution so as to generate titanium dioxide, and then, for example, adding a compound containing condensed phosphate and an alkali earth metal. Where a configuration in which the surfaces of titanium dioxide particles are coated with condensed phosphate containing an alkali earth metal as described above is employed, an effect that increases the electric capacitance and an effect that improves the cycle characteristics are more significantly obtained.

As the method for coating the surface of titanium dioxide with condensed phosphate containing an alkali earth metal as described above, for example, it is possible to employ a method in which a predetermined amount of condensed phosphate is added to a slurry (acidic aqueous solution) containing titanium dioxide to which phosphoric acid has been added in advance, is sufficiently dispersed, and then a solution of an alkali earth metal compound is added, thereby aging the mixture. In a case in which the above-described method is employed, it is preferable to maintain the mixture in a state of being heated to a certain temperature to accelerate and control the reaction. At this time, the heating temperature is preferably in a range of 30° C. to 70° C., and more preferably in a range of 40° C. to 60° C. When the heating temperature is within the above-described range, the balance between the dissolution of the condensed phosphate and the alkali earth metal compound and the reaction of the condensed phosphate and the alkali earth metal compound to titanium dioxide particle surfaces becomes favorable, and the particle surfaces can be evenly coated in a state in which the condensed phosphate is not eccentrically present. That is, when the heating temperature is 30° C. or higher, the solubility of the condensed phosphate or the alkali earth metal compound does not decrease, and therefore it is possible to maintain a high reaction rate, and the productivity improves. When the heating temperature is 70° C. or lower, it is possible to suppress the occurrence of the reaction at places other than the surfaces of the titanium dioxide particles, and therefore it becomes possible to increase the coating efficiency of the surfaces of the titanium dioxide particles.

In a case in which the surfaces of the titanium dioxide particles are coated with the condensed phosphate containing an alkali earth metal, it is preferable to age the condensed phosphate at a certain heating temperature. During the period for the above-described aging, it is assumed that some of the condensed phosphate containing an alkali earth metal is repeatedly occluded to and released from the surfaces of the titanium dioxide particles, and a reaction is caused so as to coat the particle surfaces in a state in which the surface energy is stabilized. At this time, the aging time is preferably in a range of 30 minutes to 600 minutes (30 minutes to 10 hours), and more preferably in a range of 60 minutes to 300 minutes (1 hour to 5 hours). That is, when the aging time is 30 minutes or longer, the coated state is stabilized, and the desorption of the condensed phosphate can be prevented during filtration and washing. When the aging time is 10 hours (600 minutes) or shorter, the coated state is further stabilized, and it is possible to maintain the production efficiency.

In a case in which titanium dioxide having the surfaces coated with the condensed phosphate containing an alkali earth metal is generated as described above, when phosphoric acid or sulfuric acid is added in the beginning, the dispersibility of the slurry improves. The condensation reaction efficiency of the phosphoric acid is increased when the condensed phosphate and the compound containing an alkali rear earth metal are added and aged, and the yield of the condensed phosphate containing an alkali earth metal improves. The condensed phosphate containing an alkali earth metal generated by condensation becomes easily adsorbed to the surfaces of the titanium dioxide particles, and an effect that improves the coating rate can be obtained.

The compound containing an alkali earth metal used in the present embodiment is not particularly limited as long as the compound is soluble and ionized in the solution used in the present invention. Examples of the above-described compound include chlorides, bromides, iodides, nitrates, acetates, and the like, and among the above-described compounds, chlorides for example, calcium chloride, magnesium chloride, and the like are ordinarily used, have a high solubility, and therefore are preferably used.

In the present embodiment, powder that serves as the raw material of the anode active material 12 is obtained by filtering and washing the slurry in which the powder obtained in the above-descried order is dispersed using a well-known method of the related art, and then heating and drying the slurry.

(The Step of Controlling the Structure by Annealing the Powder)

In the present embodiment, the powder (anode active material) is annealed so that titanium dioxide contained in the powder is controlled to have a structure including at least a brookite-type crystal phase and further including an amorphous phase in a range of 1 vol % to 20 vol %, and is desalinated, thereby generating the powder-form anode active material 12.

For example, a heating chamber or the like is used, and the powder is transported into the chamber, and is heated, thereby annealing the powder.

When the annealing temperature is too high, the amorphous phase transforms into a crystal phase. In addition, the low temperature-type brookite crystal phase transforms into an anatase-type crystal phase in a relatively high temperature range, specifically, a temperature range exceeding 800° C., and furthermore, transforms into a rutile-type crystal phase. When the annealing temperature is too low, it is difficult to improve the crystallinity, and the desalination effect is also weak, and therefore it becomes difficult to obtain a sufficient effect of an annealing treatment, and there is a case in which the productivity is also degraded due to an increase in the number of steps. For the above-described reason, in the present invention, when the annealing is carried out in a temperature range of 300° C. to 800° C., the proportion of the amorphous phase in titanium dioxide is controlled to 20% or less, and an effect that improves the crystallinity of the crystalline brookite is easily obtained.

In addition, in a case in which the annealing temperature is set in the above-described range, the annealing time is preferably set in a range of 10 minutes to 300 minutes. That is, when the annealing time is within the above-described range, it is possible to control the crystal phase of the annealed titanium dioxide in the above-described range, and a satisfactory annealing effect can be obtained.

Furthermore, in the producing method according to the present invention, the annealing is preferably carried out in an atmosphere of the chamber that is set to a water vapor-containing atmosphere having a mass ratio with respect to the powder, that is, a proportion of water vapor (water)/the powder (titanium dioxide) in a range of 0.01 to 1.0 since the desalination effect of removing the chlorine component remaining in the step of synthesizing the above-described powder becomes significant. When the mass ratio of the water vapor in the annealing atmosphere to the powder is less than 0.01, the above-described desalination effect is not easily obtained, and, even when water vapor is contained at a mass ratio of more than 1.0, the desalination effect does not easily improve.

In addition, in a case in which the annealing atmosphere is set to a mixed atmosphere of air and water vapor, the ratio of the water vapor to the entire atmosphere is preferably set in a range of 0.1 vol % to 30 vol %. At this time, when the ratio of the water vapor is less than 0.1 vol %, the contact efficiency between the powder and the water vapor decreases, and the desalination effect is not easily obtained. In addition, when the ratio of the water vapor exceeds 30 vol %, the desalination efficiency improves only to a small extent, and the annealing is not efficient.

In addition, when air and the water vapor are mixed, it is preferable to heat the chamber to a temperature in a range of 300° C. to 1000° C. in advance, and inject the water vapor into the annealing atmosphere of a predetermined temperature since the vapor state is stabilized.

(The Step of Applying the Anode Active Material onto the Metal Foil)

Next, in the present embodiment, a coating fluid is adjusted by dispersing the powder-form anode active material 12 in a dispersion solution, and the coating fluid is applied to and dried on one surface or both surfaces of the metal foil 11.

Generally, the anode for a secondary battery can be obtained by applying and forming the anode active material containing the carbonaceous material, the binding material, and the anode active material onto the metal foil that serves as the current collector. The method for forming a layer made of the anode active material 12 on the metal foil 11 in the present embodiment is not particularly limited, and a well-known method that is used for the producing of a secondary battery can be employed. Examples thereof include coating methods described below.

The coating methods can be selected from, for example, bar coating, gravure coating, gravure reverse coating, roll coating, meyer bar coating, blade coating, knife coating, air knife coating, comma coating, slot die coating, die coating, and dip coating. Particularly, when a layer made of a thick anode active material is formed, die coating is preferably selected since it is easy to control the thickness of a coated film.

In a case in which the layer made of the anode active material is formed using the coating method, a coating fluid obtained by dispersing the anode active material and, depending on necessity, the carbonaceous material or the binding material in a solvent is used. Here, the solvent being used is not particularly limited, and, for example, a polar aprotic solvent such as N-methyl-2-pyrolidone or γ-butyrolactone can be used. In addition, for example, a polar protic solvent such as isopropyl alcohol or n-propyl acetate may be added to the coating fluid to improve the wettability of the anode active material 12 to the metal foil 11.

Meanwhile, the blended composition of the above-described coating fluid is not particularly limited, the coating fluid can be applied as long as the coating fluid is in a slurry form or a paste form, and the composition or viscosity of the coating fluid can be adjusted in accordance with the characteristics of the coating method or a coating machine. In addition, in a case in which the coating fluid is produced, it is necessary to sufficiently stir and mix the material to uniformly disperse the material. At this time, the method for carrying out the stirring and mixing is not particularly limited, and examples thereof include methods in which a ball mill, a sand mill, a pigment disperser, a Raikai mixer, an ultrasonic disperser, a homogenizer, a planetary mixer, a HOBART mixer, or the like is used. In addition, the high-speed stirrer as described in Japanese Patent No. 3256801 is preferably used since a homogeneous coating fluid can be produced.

In addition, the layer made of the anode active material 12 is formed by coating and then drying the above-described coating fluid containing the components of the anode active material onto the metal foil 11. Meanwhile, in a case in which the layers made of the anode active material 12 are formed on both surfaces of the metal foil 11, the coating operation may be carried out on each surface, or may be carried out on both surfaces at the same time. In addition, it is also possible to increase the electrode density by carrying out a pressing treatment after the application of the coating fluid.

[Secondary Battery]

A secondary battery A according to the present invention includes the above-described anode for a secondary battery 1 as exemplified in FIG. 1. Generally, a secondary battery includes, in addition to an anode, a cathode, a separator, and a non-aqueous electrolytic solution (electrolyte), and is formed by interposing the separator and the non-aqueous electrolytic solution 3 between the anode and the cathode 2 formed by laminating a cathode active material 22 on the current collector 21, and enclosing the components using the external packaging materials 4A and 4B as illustrated in the example of the drawing.

(Cathode)

The cathode 2 is not particularly limited as long as the cathode is a cathode that is generally used in a secondary battery, and in many cases, the cathode 2 includes the cathode active material 22, the current collector 21, and the binding material not illustrated.

For the cathode active material 22, it is possible to use, for example, lithium cobalt oxide ($LiCoO_2$), lithium manganese oxide ($LiMn_2O_4$), lithium nickel oxide ($LiNiO_2$), a ternary lithium compound of Co, Mn, and Ni ($Li(Co_xMn_yNi_z)O_2$), a sulfur-based compound ($TiS_2$), an olivine-based compound ($LiFePO_4$ or $LiMnPO_4$), or the like.

In addition, examples of the conduction agent contained in the cathode active material 22 include carbon black such as acetylene black, ketjen black, and furnace black, artificial or natural graphite, carbon fibers, vapor-grown carbon fibers, carbon nanotubes, carbon nanofibers, and the like.

In addition, examples of the binding material include polyvinylidene fluoride.

In addition, as the current collector 21 on which a layer made of the cathode active material 22 is formed, similar to the metal foil 11 on which a layer made of the anode active material 12 is formed, generally, it is possible to use a current collector that is used for a current collector in a lithium ion secondary battery. That is, since there is a requirement that the material is inexpensive or an oxide film on the surface is stable so that the qualities do not easily vary, as the current collector 21, for example, a stainless steel mesh or an aluminum foil is preferably used.

(Separator)

A well-known separator that is used for a secondary battery can be used as the separator. Examples thereof include polyethylenic or polypropylenic microporous films. Meanwhile, in a case in which a polymer electrolyte or an inorganic solid electrolyte described below is used as the electrolyte, the separator may not be used. In addition, a layer including particles of an inorganic insulator such as alumina may be formed on the surface of the separator for the purpose of improving the heat resistance of the separator. The layer including particles of an inorganic insulator can be formed by, for example, mixing the particles of an inorganic insulator with a binder such as polyvinylidene fluoride, poly(N-vinylpyrrolidone), or poly(N-vinylacetoamide), and applying the mixture.

(Electrolyte)

The electrolyte may be present in the secondary battery in a form of a non-aqueous electrolytic solution, a solid electrolyte, or a polymer electrolyte. In any cases, a well-known material that is used for a lithium ion secondary battery can be used.

The non-aqueous electrolytic solution is a non-aqueous solvent including an electrolyte. Examples of the non-aqueous solvent include cyclic carbonates such as propylene carbonate (PC) and ethylene carbonate (EC), chain-like carbonates such as dimethyl carbonate (DMC), ethyl methyl carbonate (EMC), and diethyl carbonate (DEC), and other fatty acid esters, and the above-described non-aqueous solvents may be solely used, or two or more non-aqueous solvents may be mixed in an arbitrary ratio and then used. In addition, examples of the electrolyte include fluorine-containing lithium salts such as lithium hexafluorophosphate ($LiPF_6$) and lithium tetrafluoroborate ($LiBF_4$).

A solid electrolyte containing sulfide-based glass as a main component is used as the solid electrolyte (inorganic solid electrolyte). Specific examples thereof include glass ceramics containing combined components of one or more from the group consisting of, in addition to lithium sulfide, silicon sulfide, germanium sulfide, phosphorous sulfide, and boron sulfide. Among the above-described components, a combination of lithium sulfide and phosphorous sulfide is preferred in terms of a high conductivity. In addition, the composition ratio of the above-described components is not particularly limited.

In addition, the electrolyte with high crystallinity obtained by heating the above-described components is particularly preferred in terms of a high conductivity.

Furthermore, in a case in which the solid electrolyte is used, the solid electrolyte may contain, as other components, a lithium salt such as lithium silicate, lithium germanate, lithium phosphate, or lithium borate, a phosphorous single body or a sulfur single body, a halogen or a halogen compound, and the like.

In addition, in a case in which the polymer electrolyte is used instead of the above-described non-aqueous electrolyte or solid electrolyte, examples of the polymer electrolyte include polymer electrolytes obtained by adding the above-described electrolyte salt to a polyethylene oxide derivative, a polymer containing the derivative, a polypropylene oxide derivative, a polymer containing the derivative, a phosphate ester polymer, a polycarbonate derivative, a polymer containing the derivative, or the like.

(External Packaging Material)

As the external packaging materials 4A and 4B, a well-known external packaging material used for a secondary battery can be selected, and examples thereof include laminated packing materials and metal cans. From the viewpoint of an increase in the size and a decrease in the weight of the secondary battery, laminated packing materials having a light unit weight are preferred. The configuration of the laminated packing material is not particularly limited, and an example is a laminated packing material having polymer layers (resins) on both sides of a metal foil.

Out of the polymer layers, an outside layer formed on the outside of the secondary battery is, generally, selected from the viewpoint of thermal resistance, puncture strength, slippage, printing properties, and the like, and specifically, for example, a polyamide layer, a layer obtained by laminating polyester on polyamide, and the like can be used. Examples of the polyester used herein include polyethylene terephthalate, polyethylene naphthalate, polybutylene terephthalate, and the like. In addition, in a step for producing a battery, there is a case in which a coating layer for improving the resistance to the electrolytic solution is provided on the surface of the polyamide layer in consideration of possibility of the attachment of the electrolytic solution to polyamide on the outside layer. For the above-described coating layer, at least one polymer selected from fluorine-containing polymers, acryl polymers, polyurethane, polyester, and polysilicone are used.

Out of the polymer layers, an inside layer formed on the inside of the secondary battery is not particularly limited as long as the inside layer is made of a material capable of being melted by heating and enclosing the secondary battery in a bag shape, but the inside layer is preferably a layer containing polyolefin as a main component, and more preferably a layer containing polypropylene as a main component. In addition, the inside layer may be a layer obtained by laminating multiple layers, and examples thereof include a layer obtained by providing an acid-modified polypropylene layer on a metal foil side, and providing a polypropylene sheet on the acid-modified polypropylene layer. In addition, it is also possible to use a layer obtained by laminating random polypropylene and block polypropylene as the inside layer. In addition, the inside layer preferably has a thickness in a range of 20 μm to 150 μm since the enclosing property by heating is favorable.

Examples of the metal foil used for the external packaging materials 4A and 4B include an aluminum foil, a stainless steel foil, a nickel foil, and the like, and particularly, an aluminum foil is preferred due to its light weight and low price. The material of the aluminum foil is not particularly limited; however, when the workability is taken into account, a soft foil is preferred, and furthermore, in a case in which the strength is considered, generally, an aluminum-iron-based alloy foil such as A8021 or A8079 is selected. In addition, the thicknesses of the external packaging materials 4A and 4B are preferably in a range of 20 μm to 100 μm in consideration of moisture barrier properties, strength, and workability.

Meanwhile, the laminated packing material used for the external packaging materials 4A and 4B may include, in addition to the above-described layer, other layers such as an adhesive layer between the outside layer and the metal foil, and between the inside layer and the metal foil.

(Use of the Secondary Battery)

The secondary battery according to the present invention can be applied to a power supply system. In addition, the power supply system can be applied to, for example, automobiles; transportation devices such as trains, ships, and airplanes; portable devices such as mobile phones, handheld terminals, and portable computers; office devices; power-generation systems such as solar power generation systems, wind power generation systems, and fuel cell systems; and the like.

As described above, according to the anode for a secondary battery 1 as a preferred aspect of the present embodiment, high electric capacitance and excellent cycle characteristics and high-rate charge and discharge characteristics can be obtained by using titanium dioxide including at least a brookite-type crystal phase and an amorphous phase, and furthermore, setting the ratio of the amorphous phase in an appropriate range.

In addition, according to the method for producing the anode for a secondary battery 1 of the present invention, a method sequentially including a step of synthesizing powder containing at least the titanium dioxide, a step of annealing the powder so as to control the titanium dioxide contained in the powder to have a structure including at least a brookite-type crystal phase and further including an amorphous phase in a range of 1 vol % to 20 vol %, thereby generating the powder-form anode active material 12, and a step of adjusting a coating fluid in which the anode active material 12 is dispersed, applying and drying the coating fluid on one surface or both surfaces of the metal foil 11 is employed. Then, it becomes possible to manufacture the anode for a secondary battery 1 having high electric capacitance and excellent cycle characteristics and high-rate charge and discharge characteristics.

In addition, in the above-described method, in a case in which the temperature is set in a range of 300° C. to 800° C., and the time is set in a range of 10 minutes to 300 minutes when the powder is annealed, the more significant annealing effect is obtained, and it becomes easier to set the crystal phase in the powder-form anode active material 12 being generated within the above-described range. Furthermore, in a case in which the atmosphere is set to an atmosphere including water vapor in a mass ratio of 0.01 to 1.0 with respect to the powder when the powder is annealed, the desalination effect of removing the chlorine component remaining during the synthesis of the powder as well as the above-described effect of controlling the crystal phase within the above-described range improves.

In addition, according to the secondary battery A of the present invention, since the above-described anode for a secondary battery 1 is used, the electric capacitance is high, and the cycle characteristics and the high-rate charge and discharge characteristics are favorable.

EXAMPLES

Next, examples and comparative examples will be described, and the present invention will be described more specifically. Meanwhile, the present examples do not limit the scope of the present invention, and the anode for a secondary battery, the method for producing the same, and the secondary battery according to the present invention can be used after appropriate modifications within the scope of the purpose of the present invention.

Example 1

"The Synthesis of an Anode Active Material"

In Example 1, an anode active material was synthesized in the following order.

First, 954 ml of pure water was injected into a reflux condenser-equipped reaction vessel, and was heated up to 95° C. Next, 46 ml of a titanium tetrachloride aqueous solution (manufactured by Osaka Titanium Technologies) having a titanium concentration of 15 mass % was added dropwise to the reaction vessel for 10 minutes while maintaining the stirring rate of stirring blades at 200 rpm. At this time, white turbidity in the reaction vessel was observed immediately after the dropwise addition of the titanium tetrachloride aqueous solution. In addition, after the end of the dropwise addition of the titanium tetrachloride aqueous solution, furthermore, the temperature was increased to near the boiling point (104° C.), the solution was held in this state for 60 minutes, and the reaction was finished. Here, the pH of the obtained slurry was 0.2. Furthermore, chlorine in the solution was removed through electrodialysis, and the resultant pH was 5. At this time, some of the slurry was taken, and the concentration of the solid content was measured using a dried constant mass method. The concentration was 2 mass %.

Next, the obtained slurry was filtered and washed using a rotary filter press (manufactured by Kotobuki Engineering & Manufacturing Co., Ltd.), and the washing was sufficiently carried out until the electric conductivity of the filtrate reached 50 μS/cm. At this time, the pH of the slurry was 8.5. In addition, some of the slurry was taken, and the concentration of the solid content was measured. The concentration was 10 mass %. In addition, the filtration residue of the rotary filter press was dried at 120° C. for three hours, thereby obtaining powder (anode active material).

Next, in the example, the powder obtained in the above-described order was transported to a heating chamber, and was heated, thereby being annealed. At this time, the atmosphere in the chamber was set to an atmosphere including water vapor in a mass ratio of 0.5% with respect to the powder. In addition, the temperature in the chamber was set to 300° C., and the powder was annealed for 60 minutes, thereby obtaining a powder-form anode active material.

Next, as a result of analyzing the powder-form anode active material obtained through the annealing using an X-ray diffraction apparatus (for example, PANalytical X 'Pert MRD apparatus (registered trademark) manufactured by Spectris Co., Ltd.), it was possible to confirm that the powder-form anode active material was titanium dioxide including 14% of an anatase-type crystal phase, 0% of a rutile-type crystal phase, 66% of a brookite-type crystal phase, and 20% of an amorphous phase. Meanwhile in the example, to identify the amorphous phase, as an internal standard, nickel oxide powder (manufactured by Wako Pure Chemical Industries, Ltd., 99.9% reagent) was mixed with the powder-form anode active material in advance so that the content of the dried powder reached 90 weight %, and the content of the nickel oxide reached 10 weight %. In addition, at this time, the nickel oxide powder and the powder-form anode active material were sufficiently mixed in a dry manner using an agate mortar. In addition, the X-ray diffraction measurement was carried out under conditions of a tube voltage of 40 kV, a tube current of 20 mA, and a scanning range $2\theta$ of 10 degrees to 80 degrees. In addition, the Rietveld analysis of the obtained data was carried out, and the crystal phases were identified. Furthermore, a photograph of the dried powder of the anode active material was taken using a scanning electron microscope (manufactured by JEOL, Ltd., JSM-7500F), the particle diameters of 300 primary particles were measured, and the average particle diameter was obtained by number-averaging the measured particle diameters. The average particle diameter was 0.013 μm.

In addition, after the powder-form anode active material was thermally hydrolyzed, the chlorine concentration was measured using ion chromatography. Specifically, first, 0.1 g of the powder-form anode active material was weighed in a ceramic boat, approximately 0.2 g of tungsten oxide powder (manufactured by Kishida Chemical Co., Ltd., for an organic element analysis) was added as a combustion improver so as to coat the specimen. Next, the ceramic boat including the specimen was set in a specimen combustion apparatus (manufactured by Mitsubishi Chemical Corp., AQF-100), and was heated to 1100° C., thereby combusting the specimen. Next, gas generated from the specimen combustion apparatus was absorbed in 10 ml of ion chromatography eluent (1.8 mM-$Na_2CO_3$+1.7 mM-$NaHCO_3$), and then the absorbed liquid was made to have a constant volume of 20 ml using the ion chromatography eluent. In addition, the absorbed liquid at this time was analyzed using an ion chromatograph (manufactured by Thermo Fisher Scientific Inc., DX-500) and a column (Shodex SI-90), and the weight thereof was determined on the basis of 1000 μg/ml of a chlorine standard solution (manufactured by Kanto Chemical Co., Inc.).

"The Production of an Anode"

Next, in the example, 82 parts by mass of the above-described anode active material, 6 parts by mass of acetylene black (manufactured by Denki Kagaku Kogyo Kabushiki Kaisha, product name: DENKA BLACK HS-100 (registered trademark)) as a conduction agent, 12 parts by mass of polyvinylidene fluoride (manufactured by Kureha Corporation, product name: KF POLYMER #9210 (registered trademark)) as a binder, and N-methyl-2-pyrrolidone (industrial grade) as a dispersion solvent were mixed so as to exhibit appropriate fluidity, thereby producing a slurry (coating fluid) for the anode.

Next, a 20 μm-thick alkali-washed aluminum foil made of an A1085 material was prepared as an anode current collector (metal foil). In addition, the slurry for the anode was applied to one surface of the aluminum foil using a doctor blade method (clearance of 250 μm), then, was preliminarily dried at 100° C. in the atmosphere for one hour, and subsequently, was dried in a vacuum at 120° C. for one hour, thereby obtaining an anode for a secondary battery. The thickness of an electrode layer in the obtained anode for a secondary battery was 55 μm, the coating amount was 4.5 mg/cm$^2$, and the electrode density was 1.3 g/cm$^3$.

"The Production of a Battery Cell"

Next, in the example, to evaluate a battery cell of the obtained anode for a secondary battery, a three-pole cell was produced. First, the anode for a secondary battery obtained in the above-described order was cut into a diameter of 16 mm (area of 2.0 cm$^2$), and was set in a working pole. In addition, a 0.4 mm-thick lithium metal foil (manufactured by Honjo Metal Co., Ltd.) was set in a reference pole and an antipole, and a LiPF$_6$ solution (manufactured by Kishida Chemical Co., Ltd.), electrolyte 1 M-LiPF$_6$, solvent ethylene carbonate (EC):methyl ethyl carbonate (MEC) (2:3 vol %) was used and injected as the electrolytic solution into the cell so as to sufficiently immerse the electrode. Meanwhile, a 25 μm-thick separator (manufactured by Polypore K.K., product name: CELGARD #2400 (registered trademark)) was used and disposed between the working pole and the antipole so as to isolate both poles.

A battery cell of Example 1 was produced in the above-described order. Meanwhile, the battery cell was assembled in a glove box having an argon atmosphere.

"The Characteristic Evaluation of the Battery Cell"

The characteristic evaluations as described below were carried out for the battery cells obtained in the above-described order.

(The Evaluation of the Electric Capacitance)

The electric capacitance of the battery cell was evaluated in a room-temperature atmosphere. At this time, the discharge capacitance when the battery cell was charged at a constant current and a constant voltage (0.15 mA/cm$^2$, 1.0 V, and 12 μA cut), and then was discharged at a constant current (0.15 mA/cm$^2$) to 3.0 V was considered as the electric capacitance (mAh/g (anode active material)).

(The Evaluation of the Cycle Characteristics)

Cycle tests of the battery cells were carried out in a room-temperature atmosphere, and the changes in the capacitance were evaluated. At this time, the charge and discharge current was set to 0.15 mA/cm$^2$, individual battery cells were charged up to 1.0 V at a constant current, then, were discharged to 3.0 V at the same current density, and this charge and discharge cycle was repeated 100 times. In addition, the ratio of the discharge capacitance between the second cycle and the $100^{th}$ cycle (the discharge capacitance at the $100^{th}$ cycle/the discharge capacitance at the second cycle)×100 was adopted as the capacitance maintenance rate (%), and was used as an index of the cycle characteristics.

(The Evaluation of the High-Rate Charge and Discharge Characteristics)

After the charge currents of the battery cells were set to be constant at 0.15 mA/cm$^2$, and the battery cells were charged up to 1.0 V, the discharge currents were set to 0.15 mA/cm$^2$ (0.1 C, the same as the charge current), 3.0 mA/cm$^2$ (2 C, 20 times the charge current), and 7.5 mA/cm$^2$ (5 C, 50 times the charge current), and the respective battery cells were discharged to 3 V. In addition, the discharge capacitance at 0.15 mA/cm$^2$ (0.1 C) was set to 100%, the discharge capacitances of the discharge currents at 2 C and 5 C were expressed as percentages, were adopted as the capacitance maintenance rates, and were used as a characteristic index at a high-rate current.

Table 1 describes the summary of the respective production conditions in the examples (also describes Examples 2 to 9 and Comparative Examples 1 to 4).

In addition, Table 2 describes the summary of the primary particle diameters and the proportions of the crystal phases in titanium dioxides contained in the anode active materials synthesized in the examples, and the summary of the evaluation results of the respective characteristics of the produced battery cells (also describes Examples 2 to 9 and Comparative Examples 1 to 4).

TABLE 1

| | Conditions for manufacturing anode active material | | | | | | | | |
|---|---|---|---|---|---|---|---|---|---|
| | Synthesis conditions | | | | | | Annealing conditions | | |
| | Acidic aqueous solution | | | | | | | | |
| | Liquid temperature (° C.) | pH (—) | Titanium-containing compound | Addition of phosphoric acid or sulfuric acid | Holding temperature (° C.) | Holding time (min) | Temperature (° C.) | Time (min) | Vapor/powder (mass ratio) |
| Example 1 | 95 | 0.2 | Titanium tetrachloride aqueous solution | — | 104 | 60 | 300 | 60 | 0.5 |
| Example 2 | 98 | 0.5 | Titanium tetrachloride aqueous solution | Phosphoric acid | 100 | 90 | 300 | 60 | 0.6 |
| Example 3 | 80 | 0.2 | Titanium tetrachloride aqueous solution | — | 80 | 60 | 500 | 60 | 0.3 |
| Example 4 | 95 | 0.2 | Titanium tetrachloride aqueous solution | — | 104 | 60 | 500 | 60 | Atmosphere |
| Example 5 | 95 | 0.2 | Titanium tetrachloride aqueous solution | — | 104 | 60 | 315 | 60 | Atmosphere |
| Example 6 | 95 | 0.2 | Titanium tetrachloride aqueous solution | — | 104 | 60 | 785 | 60 | Atmosphere |
| Example 7 | 5 | 0.2 | Titanium tetrachloride aqueous solution | — | 104 | 60 | 500 | 16 | Atmosphere |
| Example 8 | 95 | 0.2 | Titanium tetrachloride aqueous solution | — | 104 | 60 | 500 | 285 | Atmosphere |
| Example 9 | 96 | 0.2 | Titanium tetrachloride aqueous solution | — | 104 | 60 | 500 | 60 | 0.6 |
| Comparative Example 1 | 70 | 0.3 | Titanium tetrachloride aqueous solution | — | 70 | 60 | — | — | — |
| Comparative Example 2 | 95 | 0.2 | Titanium tetrachloride aqueous solution | — | 104 | 60 | — | — | — |
| Comparative Example 3 | 95 | 0.1 | Titanium tetrachloride aqueous solution | — | 104 | 60 | 300 | 500 | 0.5 |
| Comparative Example 4 | 95 | 4.2 | Titanium tetrachloride aqueous solution | — | 104 | 60 | 300 | 60 | 0.5 |

TABLE 2

| | Characteristics of secondary battery | | | | Properties of anode active material | | | | | |
|---|---|---|---|---|---|---|---|---|---|---|
| | | Cycle characteristics | High-rate charge and discharge characteristics | | Titanium dioxide | | | | | |
| | Electric capacitance (mAh/g) | Capacitance maintenance rate after 100 cycles (%) | Capacitance maintenance rate with respect to 0.1 C discharge capacitance (%) | | Proportions of crystal phase (%) | | | | Primary particle diameter (μm) | Chlorine concentration (ppm) |
| | | | 2 C | 5 C | Anatase-type | Rutile-type | Brookite-type | Amorphous phase | | |
| Example 1 | 201 | 94 | 92 | 83 | 14 | 0 | 66 | 20 | 0.013 | 290 |
| Example 2 | 206 | 95 | 91 | 81 | 42 | 2 | 40 | 16 | 0.015 | 280 |
| Example 3 | 211 | 95 | 89 | 80 | 67 | 7 | 16 | 10 | 0.030 | 220 |

TABLE 2-continued

| | Characteristics of secondary battery | | | | Properties of anode active material | | | | | |
|---|---|---|---|---|---|---|---|---|---|---|
| | Cycle characteristics | High-rate charge and discharge characteristics | | | Titanium dioxide | | | | | |
| | Capacitance maintenance rate | Capacitance maintenance rate with respect to 0.1 C discharge capacitance (%) | | | Proportions of crystal phase (%) | | | | Primary particle | Chlorine |
| | Electric capacitance | after 100 cycles | | | Anatase- | Rutile- | Brookite- | Amorphous | diameter | concentration |
| | (mAh/g) | (%) | 2 C | 5 C | type | type | type | phase | (μm) | (ppm) |
| Example 4 | 200 | 92 | 90 | 82 | 62 | 0 | 33 | 5 | 0.060 | 530 |
| Example 5 | 201 | 95 | 91 | 83 | 17 | 0 | 66 | 17 | 0.024 | 660 |
| Example 6 | 199 | 95 | 88 | 78 | 44 | 3 | 49 | 4 | 0.088 | 420 |
| Example 7 | 200 | 94 | 90 | 81 | 21 | 0 | 65 | 14 | 0.045 | 590 |
| Example 8 | 199 | 95 | 89 | 80 | 25 | 1 | 63 | 11 | 0.071 | 490 |
| Example 9 | 202 | 94 | 91 | 80 | 22 | 0 | 65 | 13 | 0.045 | 180 |
| Comparative Example 1 | 177 | 60 | 70 | 55 | 50 | 2 | 12 | 36 | 0.030 | 1200 |
| Comparative Example 2 | 188 | 65 | 74 | 59 | 10 | 0 | 60 | 30 | 0.012 | 2300 |
| Comparative Example 3 | 180 | 62 | 66 | 60 | 19.5 | 0 | 80 | 0.5 | 0.052 | 305 |
| Comparative Example 4 | 176 | 60 | 62 | 51 | 82 | 0 | 0 | 18 | 0.009 | 780 |

As described in Table 2, in Example 1, the proportions of the brookite-type crystal phase and the amorphous phase in the crystal phases of titanium dioxide were within the ranges determined by the present invention. In addition, the concentration of chlorine contained in the anode active material was 290 ppm.

In addition, it became evident that the battery cell produced using the anode active material of Example 1 had an electric capacitance of 201 (mAh/g (anode active material)), and ensured high electric capacitance. Furthermore, it became evident that, in Example 1, the capacitance maintenance rate after 100 cycles was 94%, the capacitance maintenance rates with respect to the discharge capacitance of 0.1 C were 92% (2 C) and 83% (5 C), and the cycle characteristics and the high-rate charge and discharge characteristics were excellent.

Example 2

In Example 2, first, 5 g of phosphoric acid (special-grade reagent) was added under stirring to 47 liters of pure water that had been weighed in advance, and furthermore, the mixture was heated under stirring so as to hold the temperature at 98° C. Next, in a state in which the mixture was heated to the above-described temperature, 7 kg of a titanium tetrachloride aqueous solution (manufactured by Osaka Titanium Technologies) having a titanium concentration of 15 mass % was added dropwise for 120 minutes, furthermore, the mixture was heated to 100° C., and was held for 90 minutes. The pH of the liquid was 0.5. A white suspension obtained in the above-described order was set in an electrodialyzer so as to set the pH to 5, then, some of the obtained slurry was taken, and the concentration of the solid content was measured using the dried constant mass method. The concentration was 2 mass %.

Next, the obtained slurry was treated in the same order and conditions as in Example 1, thereby obtaining a powder-form anode active material. Furthermore, an anode for a secondary battery was produced in the same order as in Example 1 using the anode active material. In addition, a battery cell was produced in the same order as in Example 1 using the anode for a secondary battery.

In addition, similar to Example 1, the X-ray diffraction of the anode active material obtained in Example 2 was carried out, and the crystal phases in titanium dioxide were analyzed. As a result, as described in Table 2, it became evident that the proportions were 42% of an anatase-type crystal phase, 2% of a rutile-type crystal phase, 40% of a brookite-type crystal phase, and 16% of an amorphous phase, and the proportions of the crystal phases determined by the present invention were satisfied. In addition, the concentration of chlorine contained in the anode active material was 280 ppm. Furthermore, as a result of obtaining the average particle diameter of the primary particles of titanium dioxide contained in the anode active material of Example 2, the average particle diameter was 0.015 μm.

In addition, as described in Table 2, it became evident that the battery cell produced using the anode active material of Example 2 had an electric capacitance of 206 (mAh/g (anode active material)), and ensured high electric capacitance. Furthermore, it became evident that, in Example 2, the capacitance maintenance rate after 100 cycles was 95%, the capacitance maintenance rates with respect to the discharge capacitance of 0.1 C were 91% (2 C) and 81% (5 C), and the cycle characteristics and the high-rate charge and discharge characteristics were excellent.

Example 3

In Example 3, powder-form titanium dioxide (anode active material) was obtained in the same order and conditions as in Example 1 except for the facts that the liquid temperature was made to be constant at 80° C. during the dropwise addition of the titanium tetrachloride aqueous solution and during the 60-minute holding after the dropwise addition, and the synthesis conditions and the annealing conditions were set to the conditions described in Table 1. Furthermore, an anode for a secondary battery was produced in the same order as in Example 1 using the anode active material, and a battery cell was produced using the anode for a secondary battery.

In addition, similar to Example 1, the X-ray diffraction of the anode active material obtained in Example 3 was carried out, and the crystal phases in titanium dioxide were analyzed. As a result, it became evident that the proportions were 67% of an anatase-type crystal phase, 7% of a rutile-type crystal phase, 16% of a brookite-type crystal phase, and 10% of an amorphous phase, and the proportions of the crystal phases determined by the present invention were satisfied. In addition, the concentration of chlorine contained in the anode active material was 220 ppm. Furthermore, as a result of obtaining the average particle diameter of the primary particles of titanium dioxide contained in the anode active material of Example 3, the average particle diameter was 0.030 μm.

In addition, as described in Table 2, it became evident that the battery cell produced using the anode active material of Example 3 had an electric capacitance of 211 (mAh/g (anode active material)), and ensured high electric capacitance. Furthermore, it became evident that, in Example 3, the capacitance maintenance rate after 100 cycles was 95%, the capacitance maintenance rates with respect to the discharge capacitance of 0.1 C were 89% (2 C) and 80% (5 C), and the cycle characteristics and the high-rate charge and discharge characteristics were excellent.

Example 4

In Example 4, powder obtained in the same order and conditions as in Example 1 was thermally treated (annealed) in the atmosphere under conditions of 500° C. and 60 minutes (one hour), thereby obtaining a powder-form anode active material of the example. Furthermore, an anode for a secondary battery was produced in the same order as in Example 1 using the anode active material, and a battery cell was produced using the anode for a secondary battery.

In addition, similar to Example 1, the X-ray diffraction of the anode active material obtained in Example 4 was carried out, and the crystal phases in titanium dioxide were analyzed. As a result, it became evident that the proportions were 62% of an anatase-type crystal phase, 0% of a rutile-type crystal phase, 33% of a brookite-type crystal phase, and 5% of an amorphous phase, and the proportions of the crystal phases determined by the present invention were satisfied. In addition, the concentration of chlorine contained in the anode active material was 530 ppm. Furthermore, as a result of obtaining the average particle diameter of the primary particles of titanium dioxide contained in the anode active material of Example 4, the average particle diameter was 0.060 μm.

In addition, as described in Table 2, it became evident that the battery cell produced using the anode active material of Example 4 had an electric capacitance of 200 (mAh/g (anode active material)), and ensured high electric capacitance. Furthermore, it became evident that, in Example 4, the capacitance maintenance rate after 100 cycles was 92%, the capacitance maintenance rates with respect to the discharge capacitance of 0.1 C were 90% (2 C) and 82% (5 C), and the cycle characteristics and the high-rate charge and discharge characteristics were excellent.

Examples 5 to 8

In Examples 5 to 8, the powder obtained in the same order and conditions as in Example 1 was annealed in the atmosphere for the times and at the temperatures described in Table 1, thereby obtaining powder-form anode active materials. Furthermore, anodes for a secondary battery were produced in the same order as in Example 1 using the anode active materials, and battery cells were produced using the anodes for a secondary battery.

In addition, similar to Example 1, the X-ray diffraction of the anode active materials obtained in Examples 5 to 8 was carried out, and the crystal phases in titanium dioxide were analyzed. The results were that the ratios among an anatase-type crystal phase, a rutile-type crystal phase, a brookite-type crystal phase, and an amorphous phase were as described in Table 2. As described in Table 2, it is found that, in Examples 5 to 8, all the anode active materials included a brookite-type crystal phase, and included an amorphous phase within the range determined by the present invention. In addition, the concentrations of chlorine contained in the anode active materials were in a range of 420 ppm to 660 ppm. In addition, as a result of obtaining the average particle diameter of the primary particles of titanium dioxides contained in the anode active materials of Examples 5 to 8, the average particle diameters were in a range of 0.024 μm to 0.088 μm.

In addition, as described in Table 2, it became evident that the battery cells produced using the anode active materials of Examples 5 to 8 had an electric capacitance in a range of 199 to 201 (mAh/g (anode active material)), and ensured high electric capacitance. Furthermore, it became evident that, in Examples 5 to 8, the capacitance maintenance rates after 100 cycles were in a range of 94% to 95%, the capacitance maintenance rates with respect to the discharge capacitance of 0.1 C were in a range of 88% to 91% (2 C) and in a range of 78% to 83% (5 C), and the cycle characteristics and the high-rate charge and discharge characteristics were excellent.

Example 9

In Example 9, the powder obtained in the same order and conditions as in Example 1 was annealed in an atmosphere including 0.5% of water vapor in terms of the mass ratio with respect to the powder for the time and at the temperature described in Table 1, thereby obtaining a powder-form anode active material. Furthermore, an anode for a secondary battery was produced in the same order as in Example 1 using the anode active material, and a battery cell was produced using the anode for a secondary battery.

In addition, similar to Example 1, the X-ray diffraction of the anode active material obtained in Example 9 was carried out, and the crystal phases in titanium dioxide were analyzed. The result was that the ratio among an anatase-type crystal phase, a rutile-type crystal phase, a brookite-type crystal phase, and an amorphous phase was as described in Table 2. As described in Table 2, it is found that, in Example 9, the anode active material included a brookite-type crystal phase, and included an amorphous phase within the range determined by the present invention. In addition, it is found that, in Example 9, the concentrations of chlorine contained in the annealed anode active material was 180 ppm, and the chlorine component was sufficiently removed due to the annealing.

Furthermore, as a result of obtaining the average particle diameter of the primary particles of titanium dioxide contained in the anode active material of Example 9, the average particle diameter was 0.045 μm.

In addition, as described in Table 2, it became evident that the battery cell produced using the anode active material of Example 9 had an electric capacitance of 202 (mAh/g (anode active material)), and ensured high electric capacitance. Furthermore, it became evident that, in Example 9, the capacitance maintenance rate after 100 cycles was 94%, the capacitance maintenance rate with respect to the discharge capacitance of 0.1 C were 91% (2 C) and 80% (5 C), and the cycle characteristics and the high-rate charge and discharge characteristics were excellent.

Comparative Example 1

In Comparative Example 1, powder-form titanium dioxide (anode active material) was obtained in the same order and conditions as in Example 1 except for the facts that the liquid temperature was made to be constant at 70° C. during the dropwise addition of the titanium tetrachloride aqueous solution and during the 60-minute holding after the dropwise addition, and the annealing treatment of the powder was not carried out. Furthermore, an anode for a secondary battery was produced in the same order as in Example 1 using the anode active material, and a battery cell was produced using the anode for a secondary battery.

In addition, similar to Example 1, an X-ray diffraction of the anode active material obtained in Comparative Example 1 was carried out, and the crystal phases in titanium dioxide were analyzed. As a result, it became evident that the proportions were 50% of an anatase-type crystal phase, 2% of a rutile-type crystal phase, 12% of a brookite-type crystal phase, and 36% of an amorphous phase, and the proportion of the amorphous phase was high. This is considered to be because, in Comparative Example 1, the liquid temperature of the acidic aqueous solution was low when titanium dioxide was synthesized. In addition, the concentration of chlorine contained in the anode active material was 1200 ppm, which was a high concentration state. Furthermore, as a result of obtaining the average particle diameter of the primary particles of titanium dioxide contained in the anode active material of Comparative Example 1, the average particle diameter was 0.030 μm.

In addition, as described in Table 2, it is found that the battery cell produced using the anode active material of Comparative Example 1 had an electric capacitance of 177 (mAh/g (anode active material)) that was poorer than the electric capacitances in Examples 1 to 9. Furthermore, it is found that, in Comparative Example 1, the capacitance maintenance rate after 100 cycles was 60%, the capacitance maintenance rates with respect to the discharge capacitance of 0.1 C were 70% (2 C) and 55% (5 C), and the cycle characteristics and the high-rate charge and discharge characteristics were poorer than those in Examples 1 to 9.

Comparative Example 2

In Comparative Example 2, powder-form titanium dioxide (anode active material) was obtained in the same order and conditions as in Example 1 except for the fact that powder containing titanium oxide was not annealed. Furthermore, an anode for a secondary battery was produced in the same order as in Example 1 using the anode active material, and a battery cell was produced using the anode for a secondary battery.

In addition, similar to Example 1, an X-ray diffraction of the anode active material obtained in Comparative Example 2 was carried out, and the crystal phases in titanium dioxide were analyzed. As a result, it became evident that, in Comparative Example 2, the proportions were 10% of an anatase-type crystal phase, 0% of a rutile-type crystal phase, 60% of a brookite-type crystal phase, and 30% of an amorphous phase, and the proportion of the amorphous phase was high. This is considered to be because, in Comparative Example 1, the anode active material was not annealed. In addition, the concentration of chlorine contained in the anode active material was 2300 ppm, which was an extremely high concentration state. Furthermore, as a result of obtaining the average particle diameter of the primary particles of titanium dioxide contained in the anode active material of Comparative Example 2, the average particle diameter was 0.012 μm.

In addition, as described in Table 2, it is found that the battery cell produced using the anode active material of Comparative Example 2 had an electric capacitance of 188 (mAh/g (anode active material)) that was poorer than the electric capacitances in Examples 1 to 9. Furthermore, it is found that, in Comparative Example 2, the capacitance maintenance rate after 100 cycles was 65%, the capacitance maintenance rates with respect to the discharge capacitance of 0.1 C were 74% (2 C) and 59% (5 C), and the cycle characteristics and the high-rate charge and discharge characteristics were poorer than those in Examples 1 to 9.

Comparative Example 3

In Comparative Example 3, powder-form titanium dioxide (anode active material) was obtained in the same order and conditions as in Example 1 except for the facts that the amount of the titanium tetrachloride aqueous solution was set to 100 ml, and furthermore, the annealing time was set to 500 minutes. Furthermore, an anode for a secondary battery was produced in the same order as in Example 1 using the anode active material, and a battery cell was produced using the anode for a secondary battery.

In addition, similar to Example 1, an X-ray diffraction measurement of the anode active material obtained in Comparative Example 3 was carried out, and the crystal phases in titanium dioxide were analyzed. As a result, it became evident that, in Comparative Example 3, the proportions were 19.5% of an anatase-type crystal phase, 0% of a rutile-type crystal phase, 80% of a brookite-type crystal phase, and 0.5% of an amorphous phase, and the proportion of the amorphous phase was small. This is considered to be because, in Comparative Example 3, the annealing time was long. In addition, the concentration of chlorine contained in the anode active material was 305 ppm. Furthermore, as a result of obtaining the average particle diameter of the primary particles of titanium dioxide contained in the anode active material of Comparative Example 3, the average particle diameter was 0.052 μm.

In addition, as described in Table 2, it is found that the battery cell produced using the anode active material of Comparative Example 3 had an electric capacitance of 180 (mAh/g (anode active material)) that was poorer than the electric capacitances in Examples 1 to 9. Furthermore, it is found that, in Comparative Example 3, the capacitance maintenance rate after 100 cycles was 62%, the capacitance maintenance rates with respect to the discharge capacitance of 0.1 C were 66% (2 C) and 60% (5 C), and the cycle characteristics and the high-rate charge and discharge characteristics were poorer than those in Examples 1 to 9.

Comparative Example 4

In Comparative Example 4, powder-form titanium dioxide (anode active material) was obtained in the same order and conditions as in Example 1 except for the fact that the amount of the titanium tetrachloride aqueous solution was set to 12 ml. Furthermore, an anode for a secondary battery was produced in the same order as in Example 1 using the anode active material, and a battery cell was produced using the anode for a secondary battery.

In addition, similar to Example 1, an X-ray diffraction of the anode active material obtained in Comparative Example 4 was carried out, and the crystal phases in titanium dioxide were interpreted. As a result, it became evident that, in Comparative Example 4, the proportions were 82% of an anatase-type crystal phase, 0% of a rutile-type crystal phase, 0% of a brookite-type crystal phase, and 18% of an amorphous phase, and the brookite-type crystal phase was not included. This is considered to be because, in Comparative Example 4, the chlorine concentration was low, and the pH was high when titanium dioxide was generated. In addition, the concentration of chlorine contained in the anode active material was 780 ppm. Furthermore, as a result of obtaining the average particle diameter of the primary particles of titanium dioxide contained in the anode active material of Comparative Example 4, the average particle diameter was 0.009 μm.

In addition, as described in Table 2, it is found that the battery cell produced using the anode active material of Comparative Example 4 had an electric capacitance of 176 (mAh/g (anode active material)) that was poorer than the electric capacitances in Examples 1 to 9. Furthermore, it is found that, in Comparative Example 4, the capacitance maintenance rate after 100 cycles was 60%, the capacitance maintenance rates with respect to the discharge capacitance of 0.1 C were 62% (2 C) and 51% (5 C), and the cycle characteristics and the high-rate charge and discharge characteristics were poorer than those in Examples 1 to 9.

From the results of the above-described examples, it is evident that the anode for a secondary battery that is manufactured under the conditions determined in the present invention and has appropriate crystal phases of titanium dioxide, and the secondary battery using the same have a large electric capacitance, and are excellent in terms of the cycle characteristics and the high-rate charge and discharge characteristics.

INDUSTRIAL APPLICABILITY

According to the anode for a secondary battery of the present invention, a large electric capacitance, excellent cycle characteristics and high-rate charge and discharge characteristics can be obtained. In addition, according to the method for producing an anode for a secondary battery of the present invention, it becomes possible to manufacture an anode for a secondary battery having a large electric capacitance, excellent cycle characteristics, and high-rate charge and discharge characteristics.

In addition, according to the secondary battery of the present invention, the electric capacitance increases, and the cycle characteristics and high-rate charge and discharge characteristics become favorable. Therefore, the present invention should be extremely useful in industrial fields.

REFERENCE SIGNS LIST

1 ANODE FOR SECONDARY BATTERY
11 METAL FOIL
12 ANODE ACTIVE MATERIAL
2 CATHODE
21 CURRENT COLLECTOR
22 CATHODE ACTIVE MATERIAL
3 SEPARATOR AND NON-AQUEOUS ELECTROLYTIC SOLUTION
4A, 4B EXTERNAL PACKAGING MATERIAL
A SECONDARY BATTERY

The invention claimed is:

1. An anode for a lithium ion secondary battery obtained by laminating a layer containing at least an anode active material on a metal foil,
    wherein the anode active material contains at least titanium dioxide,
    the titanium dioxide includes a brookite-type crystal phase, and includes an amorphous phase in a ratio of 4 vol % to 20 vol % with respect to all crystal phases and all amorphous phases.

2. The anode for a lithium ion secondary battery according to claim 1,
    wherein the titanium dioxide includes the brookite-type crystal phase in a ratio of 1 vol % to 80 vol % with respect to all crystal phases and all amorphous phases of the titanium dioxide.

3. The anode for a lithium ion secondary battery according to claim 1,
    wherein the titanium dioxide further includes one or more crystal layers selected from the group consisting of anatase-type titanium dioxide, rutile-type titanium dioxide, and bronze-type titanium dioxide.

4. The anode for a lithium ion secondary battery according to claim 1,
    wherein an average particle diameter of primary particles of the titanium dioxide is in a range of 0.001 μm to 0.1 μm.

5. The anode for a lithium ion secondary battery according to claim 1, further comprising:
    a carbonaceous material.

6. The anode for a lithium ion secondary battery according to claim 5,
    wherein the carbonaceous material is one or more selected from the group consisting of acetylene black, ketjen black, furnace black, channel black, natural graphite, artificial graphite, carbon nanotubes, carbon nanofibers and carbon fibers.

7. The anode for a lithium ion secondary battery according to claim 1,
    wherein the metal foil is made of an aluminum foil.

8. A method for producing an anode for a lithium ion secondary battery, comprising in the following order:
    a step of synthesizing powder containing at least the titanium dioxide by hydrolyzing a titanium-containing compound in an acidic aqueous solution so as to generate titanium dioxide, and then drying the titanium dioxide;
    a step of annealing the powder so as to control the titanium dioxide contained in the powder to have a structure including at least a brookite-type crystal phase and further including an amorphous phase in a range of 4 vol % to 20 vol %, with respect to all crystal phases and all amorphous phases thereby generating a powder-form anode active material; and
    a step of dispersing the powder-form anode active material in a dispersion solution so as to adjust a coating fluid, applying and drying the coating fluid on one surface or both surfaces of a metal foil.

9. The method for producing an anode for a lithium ion secondary battery according to claim 8, wherein, in the step of synthesizing the powder, a chloride is used as the titanium-containing compound.

10. The method for producing an anode for a lithium ion secondary battery according to claim 8,
wherein, when the powder is annealed, a temperature is set in a range of 300° C. to 800° C., and a time is set in a range of 10 minutes to 300 minutes.

11. The method for producing an anode for a lithium ion secondary battery according to claim 8,
wherein, when the powder is annealed, an atmosphere is set to include water vapor in a mass ratio of 0.01 to 1.0 with respect to the powder.

12. A lithium ion secondary battery comprising:
the anode for a secondary battery according to claim 1.

13. The lithium ion secondary battery according to claim 12, formed by enclosing the anode for a secondary battery in an external packaging material together with a cathode, a separator, and a non-aqueous electrolytic solution.

14. The lithium ion secondary battery according to claim 13,
wherein the external packaging material is obtained by laminating a resin on both surfaces of an aluminum foil.

15. The anode for a lithium ion secondary battery according to claim 1, wherein the metal foil is made of aluminum or alloy thereof and thickness of the metal foil is in range of 5 μm to 200 μm.

* * * * *